(12) United States Patent
Ikenaga

(10) Patent No.: US 7,897,651 B2
(45) Date of Patent: Mar. 1, 2011

(54) METHOD FOR DEPOLYMERIZING POLYESTER AND UNSATURATED POLYESTER, AND METHOD FOR RECOVERING POLYESTER MONOMER USING THE DEPOLYMERIZATION

(76) Inventor: Kazutoshi Ikenaga, Kumamoto (JP)

( * ) Notice: Subject to any disclaimer, the term of this patent is extended or adjusted under 35 U.S.C. 154(b) by 440 days.

(21) Appl. No.: 12/096,458

(22) PCT Filed: Sep. 29, 2006

(86) PCT No.: PCT/JP2006/319534

§ 371 (c)(1),
(2), (4) Date: Jun. 6, 2008

(87) PCT Pub. No.: WO2007/066446

PCT Pub. Date: Jun. 14, 2007

(65) Prior Publication Data

US 2009/0318579 A1    Dec. 24, 2009

(30) Foreign Application Priority Data

Dec. 9, 2005    (JP) .............................. 2005-355701
Apr. 6, 2006    (JP) .............................. 2006-104823

(51) Int. Cl.
| C08J 11/10 | (2006.01) |
|---|---|
| C08J 11/00 | (2006.01) |
| C08J 11/04 | (2006.01) |
| C08J 11/22 | (2006.01) |
| C08J 11/28 | (2006.01) |
| C08F 2/46 | (2006.01) |
| C08F 2/24 | (2006.01) |

(52) U.S. Cl. ........................ 521/48.5; 521/40; 521/48; 522/81; 522/82; 522/83; 522/104; 522/150; 522/153; 522/178; 522/165; 522/182

(58) Field of Classification Search .................. 523/40, 523/48, 48.5; 522/81, 82, 83, 104, 150, 153, 522/162, 178, 179
See application file for complete search history.

(56) References Cited

U.S. PATENT DOCUMENTS

| 5,554,657 | A | * | 9/1996 | Brownscombe et al. | ....... 521/48 |
| 5,705,601 | A | * | 1/1998 | Ueda et al. | ............. 528/308.2 |
| 6,034,203 | A | * | 3/2000 | Lustig et al. | ............... 528/279 |
| 6,162,837 | A | * | 12/2000 | Gerking et al. | ............... 521/48 |
| 6,175,037 | B1 | * | 1/2001 | Tweedy | ..................... 560/224 |
| 6,518,322 | B1 | * | 2/2003 | West | ........................ 521/48.5 |
| 6,645,445 | B1 | * | 11/2003 | Inada et al. | ................... 423/84 |
| 6,649,792 | B2 | * | 11/2003 | Sirek et al. | .................. 562/483 |
| 7,799,836 | B2 | * | 9/2010 | Agarwal et al. | ............... 521/40 |

FOREIGN PATENT DOCUMENTS

| EP | 0693527 A1 |   | 1/1996 |
| JP | 8225635 A |   | 9/1996 |
| JP | 10310637 A | * | 11/1998 |
| JP | 11100336 A |   | 4/1999 |
| JP | 11302208 A |   | 11/1999 |
| JP | 2000212117 A |   | 8/2000 |
| JP | 2002114839 A | * | 4/2002 |
| JP | 2002167468 A |   | 6/2002 |
| JP | 2002249557 A | * | 9/2002 |
| JP | 2002332379 A | * | 11/2002 |
| JP | 2003160521 A |   | 6/2003 |
| JP | 2003527363 A |   | 9/2003 |
| JP | 2003292594 A |   | 10/2003 |
| JP | 2003300916 A |   | 10/2003 |
| JP | 2004300115 A |   | 10/2004 |
| JP | 2005048053 A |   | 2/2005 |
| JP | 2005255780 A |   | 9/2005 |
| JP | 2005255897 A |   | 9/2005 |
| JP | 2006335856 A |   | 12/2006 |
| WO | WO 03064510 A1 | * | 8/2003 |
| WO | WO 2005092963 A1 | * | 10/2005 |

OTHER PUBLICATIONS

Sinha et al. Pet Waste Management by Chemical Recycling: A Review . Journal of Polymers and the Environment vol. 18, No. 1, 8-25 (2010).*

Mori, Hajime et al., "Decomposition reaction of PET using microwave", Japan, Industrial Technology Center of Wakayama Prefecture, 2005, p. 23 with English translation.

Krzan, Andrej, "Poly(ethyleve terephthalate) Glycolysis Under Mocrowave Irradiation", Polymers For Advanced Technologies, 1999, pp. 603-606, John Wiley & Sons, Ltd., USA.

* cited by examiner

*Primary Examiner*—Sanza L McClendon
(74) *Attorney, Agent, or Firm*—The Webb Law Firm

(57) ABSTRACT

A method for rapidly depolymerizing a polyester and an unsaturated polyester by irradiating the polyester with microwaves in the presence of an alkylene glycol in which a titanium oxide fine powder having a bulk density of not more than 0.3 g/cm$^3$ has been dispersed. Another embodiment comprises irradiating a polyester or an unsaturated polyester with microwaves in the presence of a monohydric alcohol or polyhydric alcohol containing an alkali metal and/or an alkaline earth metal. As a result, raw materials of a polyester, an unsaturated polyester or a polyurethane, such as an alkylene glycol and an unsaturated dibasic acid, can be recovered efficiently.

23 Claims, No Drawings

METHOD FOR DEPOLYMERIZING POLYESTER AND UNSATURATED POLYESTER, AND METHOD FOR RECOVERING POLYESTER MONOMER USING THE DEPOLYMERIZATION

TECHNICAL FIELD

The present invention relates to a method for depolymerizing a polyester and an unsaturated polyester and a method for recovering a polyester monomer using the depolymerization.

BACKGROUND ART

Since polyesters such as polyethylene terephthalate (PET) have excellent chemical stability, they have been used for fibers, films, sheets, beverages bottles, etc. Since unsaturated polyesters are lightweight and excellent in weathering resistance, chemical resistance and heat resistance, they have been used as fiber-reinforced plastics (FRP) for producing molded articles, such as purifying tanks, bathtubs and small ships.

In recent years, disposal of waste matters of the above polyesters and the like has become a problem, and various methods to recover and reuse the waste matters have been studied. As one of the methods, so-called feedstock recycling comprising depolymerizing a waste matter of a polyester or the like to convert it into monomers and performing polymerization reaction using the monomers as raw materials to form a polyester such as PET again has been studied. This feedstock recycling is expected as a means capable of realizing reuse of resources because separation of impurities is feasible and the qualities of the raw materials do not differ so much from those of virgin materials.

As methods for depolymerizing a polyester into monomers, broadly divided three methods, i.e., a hydrolysis method using water as a solvent, an alcoholysis method using an alcohol as a solvent and a glycolysis method using a glycol as a solvent, have been proposed.

The hydrolysis method is, for example, a method wherein a polyethylene terephthalate melt is allowed to react with water vapors and then allowed to react with ammonium hydroxide to decompose polyethylene terephthalate into terephthalic acid and ethylene glycol (patent document 1). Although this method has an advantage that a glycol or an alcohol does not need to be used for the reaction, it is necessary to use a pressure-resistant special apparatus because the reaction is carried out under the conditions of high pressure.

The alcoholysis method is, for example, a method wherein a polyester is heated in an alcohol solvent (if necessary, a catalyst is added) to depolymerize the polyester (patent document 2, patent document 3). This method has an advantage that when PET is depolymerized using, for example, methanol as a solvent, dimethyl terephthalate (sometimes abbreviated to "DMT" hereinafter) that is a useful and easy-handling monomer is directly formed by the depolymerization reaction and the depolymerization reaction proceeds relatively rapidly. On the other hand, the alcohol used as a solvent is low-boiling, and in order to promote the reaction, application of pressure is necessary (for example, reaction is carried out in methanol in a supercritical or subcritical state), so that there is a problem that a pressure-resistant special apparatus is necessary.

The glycolysis method is a method wherein a polyester is heated together with a depolymerization catalyst such as sodium carbonate in an excess alkylene glycol solvent to depolymerize the polyester and thereby form a bis($\beta$-hydroxyalkyl)terephthalate and ethylene glycol (patent document 4, patent document 5). For example, when ethylene glycol is used as a solvent, bis($\beta$-hydroxyethyl)terephthalate (sometimes abbreviated to "BHET" hereinafter) is formed by the depolymerization reaction, and by further adding methanol in the presence of a transesterification catalyst and performing transesterification reaction, DMT can be recovered.

In this glycolysis method, the reaction can be carried out at atmospheric pressure. However, the reaction time is relatively long (e.g., about 4 hours according to the working example of the patent document 4), and hence, operating efficiency is not enhanced. Further, there is another problem that the glycol as a solvent is deteriorated because it is heated for a long period of time. Therefore, shortening of the reaction time has been desired.

In a patent document 6, a depolymerization method wherein PET is allowed to react with sodium hydroxide in ethylene glycol containing sodium hydroxide and water to form sodium terephthalate is disclosed. According to this depolymerization method, it is possible to depolymerize PET for a shorter period of time (about 15 minutes to 1 hour) than in the above-mentioned glycolysis method, and for example, in the working example of the patent document 6, it is described that by heating and stirring PET at about 180° C. for about 1 hour, PET was depolymerized and sodium terephthalate was obtained.

The glycolysis method is also utilized as a method for depolymerizing an unsaturated polyester. For example, in a patent document 7, a method for depolymerizing an unsaturated polyester comprising heating unsaturated polyester waste in a glycol solvent such as ethylene glycol (preferably in the presence of a catalyst such as sodium ethylate) is proposed. Also in the depolymerization of an unsaturated polyester by this method, however, a long period of time is required for the reaction, similarly to the case of depolymerizing a polyester. For example, in Example 1 of the patent document 7, it is described that reaction at 180° C. for 5 hours and then at 200° C. for 8 hours resulted in an unsaturated polyester decomposition ratio of 54.4%. However, the levels of this period of time required and the decomposition ratio are insufficient for industrialization.

In a patent document 8, a depolymerization method wherein unsaturated polyester waste is allowed to react with a glycol at a relatively high temperature of about 150 to 300° C. in the presence of a radical initiator to cut even a part of styrene crosslinkage that is hardly decomposed by a usual glycolysis method, and a method for synthesizing an unsaturated polyester by subjecting the above decomposition product (oligomer) to condensation reaction with a dibasic acid are disclosed. Also this depolymerization method, however, needs a high temperature, a high pressure and a long period of time, and for example, in Example 1 of the patent document 8, it is described that reaction was carried out at 290° C. for 2 hours and that the pressure at the time of completion of decomposition was 3.7 MPa.

In a patent document 9, it is described that in a step of depolymerizing a polyester into an oligomer (e.g., degree of polymerization: not more than 800), the depolymerization reaction is accelerated by irradiation with microwaves using an electronic oven or the like and that also in a step of producing an unsaturated polyester resin by adding an unsaturated polybasic acid or the like to the oligomer obtained by the above depolymerization and then copolymerizing them, the polymerization reaction is accelerated by irradiation with microwaves. Further, it is suggested that microwaves not only increase the temperature of the reactant in the polymerization reaction (esterification reaction) or the depolymerization reaction but also exert a great effect on the reaction itself.

More specifically, it is described in Example B of the patent document 9 that waste PET bottle flakes, propylene glycol and dibutyl oxide that was a depolymerization catalyst were introduced into an extruder first, the PET was depolymerized to prepare an oligomer having a molecular weight of about 1500, and then the oligomer was irradiated with microwaves at a frequency of 2450 MHz for 30 minutes under heating at not lower than 180° C. with stirring to thereby decrease the molecular weight to about 700.

According to the invention described in the patent document 9, however, even if the polyester is depolymerized by continuously irradiating it with microwaves for about 30 minutes after heating, the resulting substance is an oligomer to the end, and any monomer favorable for reuse has not been obtained. Moreover, it is necessary to depolymerize the polyester to a certain extent using an extruder prior to irradiation with microwaves.

Patent document 1: JP 2003-527363 A
Patent document 2: JP H11(1999)-100336 A
Patent document 3: JP 2003-300916 A
Patent document 4: JP 2002-167468 A
Patent document 5: JP 2004-300115 A
Patent document 6: JP H11(1999)-302208 A
Patent document 7: JP H08 (1996)-225635 A
Patent document 8: JP 2005-255780 A
Patent document 9: JP 2003-292594 A Such publicly known conventional methods for depolymerizing a polyester or an unsaturated polyester as described above require a long processing time of at least several tens of minutes to several hours, and this causes a bottleneck in the mass disposal of polyester waste. In the conventional methods, further, reaction must be carried out under the conditions of high temperature or high pressure, and therefore, a special apparatus capable of withstanding such reaction conditions has been also required. It is an object of the present invention to solve such problems in such conventional feedstock recycling.

That is to say, it is an object of the invention to provide a method for depolymerizing a polyester and an unsaturated polyester, which can be rapidly carried out by a simple apparatus. It is another object of the invention to provide, in another embodiment of the invention, a method for recovering a polyester monomer containing small amounts of impurities, which uses the depolymerization.

SUMMARY OF THE INVENTION

The method for depolymerizing a polyester according to the present invention comprises irradiating a polyester or a molded article containing a polyester with microwaves in the presence of a given reaction solvent. Such depolymerization methods of the invention are broadly divided into three methods by differences in modes of the target (polyester or unsaturated polyester) and the reaction solvent.

The first depolymerization method of the invention comprises irradiating a polyester or a molded article containing a polyester with microwaves in the presence of an alkylene glycol in which a titanium oxide fine powder having a bulk density of not more than 0.3 g/cm$^3$ has been dispersed. The polyester or the molded article containing a polyester is preferably polyethylene terephthalate or a molded article containing polyethylene terephthalate.

As the titanium oxide, anatase type titanium oxide is preferable. As the alkylene glycol, ethylene glycol and/or propylene glycol is preferable.

A polyester monomer can be recovered through a step of immersing a polyester or a molded article containing a polyester in an alkylene glycol in which a titanium oxide fine powder having a bulk density of not more than 0.3 g/cm$^3$ has been dispersed and a step of irradiating the polyester with microwaves in accordance with the first depolymerization method to depolymerize the polyester and thereby form an alkylene glycol and a bis-β-hydroxyalkyl ester of a saturated dibasic acid, and additionally, a step of forming a dimethyl ester of a saturated dibasic acid by transesterification reaction of the bis-β-hydroxyalkyl ester of a saturated basic acid with methanol. The alkylene glycol formed by the depolymerization reaction can be reused by adding it to the solvent for the depolymerization reaction.

The second depolymerization method of the invention comprises irradiating a polyester or a molded article containing a polyester with microwaves in the presence of a monohydric alcohol or polyhydric alcohol containing an alkali metal and/or an alkaline earth metal. The polyester or the molded article containing a polyester is preferably polyethylene terephthalate or a molded article containing polyethylene terephthalate.

The alkali metal is preferably one or more alkali metals selected from the group consisting of sodium, potassium and lithium. The polyhydric alcohol solvent containing an alkali metal is preferably one obtained by adding one or more alkali metal compounds selected from the group consisting of hydroxides, carbonates, hydrogencarbonates and phosphates of alkali metals to a monohydric alcohol or polyhydric alcohol solvent.

On the other hand, the monohydric alcohol or the polyhydric alcohol preferably comprises at least one alcohol selected from the group consisting of ethylene glycol, n-propylene glycol, isopropylene glycol, diethylene glycol, polyethylene glycol, triethylene glycol and glycerol, alkyl ether compounds of these alcohols, and benzyl alcohol.

Raw materials of a polyester, an unsaturated polyester or a polyurethane can be recovered through a step of immersing a polyester or a molded article containing a polyester in a monohydric alcohol or polyhydric alcohol containing an alkali metal and/or an alkaline earth metal and a step of irradiating the polyester with microwaves in accordance with the second depolymerization method to depolymerize the polyester and thereby form an alkylene glycol and a dialkali metal salt of a saturated dibasic acid, and additionally, a step of neutralizing the dialkali metal salt of a saturated dibasic acid with an acid to form a saturated dibasic acid. The alkylene glycol formed by the depolymerization reaction can be reused by adding it to the solvent for the depolymerization reaction.

The third depolymerization method of the invention comprises irradiating an unsaturated polyester or a molded article containing an unsaturated polyester with microwaves in the presence of a monohydric alcohol or polyhydric alcohol containing an alkali metal and/or an alkaline earth metal. The molded article containing an unsaturated polyester is preferably a molded article containing a (glass) fiber-reinforced unsaturated polyester.

The alkali metal is preferably one or more alkali metals selected from the group consisting of sodium, potassium and lithium. The monohydric alcohol or polyhydric alcohol solvent containing an alkali metal is preferably one obtained by adding one or more alkali metal compounds selected from the group consisting of hydroxides, carbonates, hydrogencarbonates and phosphates of alkali metals to a monohydric alcohol or polyhydric alcohol solvent.

On the other hand, the monohydric alcohol or the polyhydric alcohol preferably comprises at least one alcohol selected from the group consisting of ethylene glycol, n-propylene glycol, isopropylene glycol, diethylene glycol, polyethylene glycol, triethylene glycol and glycerol, alkyl ether compounds of these alcohols, and benzyl alcohol.

Raw materials of a polyester, an unsaturated polyester or a polyurethane can be recovered through a step of immersing an unsaturated polyester or a molded article containing an unsaturated polyester in a monohydric alcohol or polyhydric alcohol containing an alkali metal and/or an alkaline earth metal and a step of irradiating the unsaturated polyester with microwaves in accordance with the third depolymerization method to depolymerize the unsaturated polyester and thereby form an alkylene glycol and an ester compound of an oligomer that is a partial decomposition product of an unsaturated polyester. The alkylene glycol formed by the depolymerization reaction can be reused by adding it to the solvent for the depolymerization reaction.

In each of the second and the third depolymerization methods, two different reaction types based on differences in quantities of the alkali metal and/or the alkaline earth metal and the monohydric alcohol or the polyhydric alcohol used are observed though the details are described later. Of the two different reaction types, the reaction type wherein a dialkali metal salt of a saturated dibasic acid is formed is sometimes referred to as "alkali hydrolysis type", and the reaction type wherein an ester compound of a saturated dibasic acid is formed is sometimes referred to as "transesterification type".

In the description of the invention, the first depolymerization method of the invention whose target is a polyester and the method for recovering a monomer using this depolymerization method are each sometimes referred to as a "first embodiment of the invention"; the second depolymerization method of the invention whose target is a polyester wherein a reaction of alkali hydrolysis type takes place and the method for recovering a monomer using this depolymerization method are each sometimes referred to as a "second embodiment of the invention"; the second depolymerization method of the invention wherein a reaction of transesterification type takes place and the method for recovering a monomer using this depolymerization method are each sometimes referred to as a "third embodiment of the invention"; the third depolymerization method of the invention whose target is an unsaturated polyester wherein a reaction of alkali hydrolysis type takes place is sometimes referred to as a "fourth embodiment of the invention"; and the third depolymerization method of the invention wherein a reaction of transesterification type takes place is sometimes referred to as a "fifth embodiment of the invention."

In the conventional glycolysis reaction and the like, depolymerization of a polyester needs a long period of time, but in the present invention, the depolymerization reaction time is remarkably shortened. Especially in the second to the fifth embodiments of the invention, it is possible to depolymerize a polyester in a conversion close to 100% in about several minutes to 120 minutes, and it has become possible to carry out depolymerization of polyester waste or the like rapidly and efficiently.

Further, the depolymerization method of the invention does not need a heating/pressurizing apparatus and can be carried out by a simple apparatus to which a microwave heating apparatus has been applied. On this account, it becomes easy that waste matters such as recovered PET bottles are reduced in volume and converted into monomers in the locality thereof, and moreover, it also becomes possible to transport the monomers to an unsaturated polyester factory and to reuse them.

For example, in the second embodiment of the invention, a saturated dibasic acid (aromatic dicarboxylic acid or the like) can be precipitated and separated as a metal salt by depolymerization, and hence, a high-purity saturated dibasic acid which can be sufficiently reused as a raw material monomer of a polyester is obtained. On the other hand, in the third embodiment or the fifth embodiment of the invention, an ester compound of a saturated dibasic acid or an oligomer (partial decomposition product of unsaturated polyester) having a residue of an alcohol used as a reaction solvent is obtained. Such a compound can be used as a raw material for producing a saturated or unsaturated polyester after the compound is subjected to transesterification reaction with methanol or the like to convert it into DMT or the like.

Even if a polyester or the like is heated by irradiation with microwaves in the depolymerization method of the invention, the microwave irradiation time is short. By the use of the depolymerization method of the invention, therefore, an alkylene glycol formed by the depolymerization is deteriorated little, and it can be recovered as a high-purity alkylene glycol.

BEST MODE FOR CARRYING OUT THE INVENTION

Modes of the polyester and the unsaturated polyester which are targets of the depolymerization methods of the invention and the molded articles containing them are not specifically restricted, and those produced by publicly known general means are employable. Next, matters relating to the polyester, the unsaturated polyester and the molded articles containing them are described in order.

Polyester

The "polyester" that is a target of the depolymerization methods of the first to the third embodiments of the invention is a polyester obtained by polymerizing a saturated dibasic acid and an alkylene glycol (e.g., polyethylene terephthalate, polybutylene terephthalate, polyethylene naphthalate) or polycaprolactone obtained by polymerizing caprolactone. By depolymerizing such a polyester, a saturated dibasic acid, an alkylene glycol or caprolactone can be recovered as a monomer.

Unsaturated Polyester

The "unsaturated polyester" that is a target of the depolymerization methods of the fourth and the fifth embodiments of the invention is such a general unsaturated polyester as can be prepared by, for example, polycondensing a saturated dibasic acid, an unsaturated polybasic acid and an alkylene glycol to form an unsaturated alkyd resin and dissolving the alkyd resin in a polymerizable vinyl monomer (crosslinking monomer).

Alkylene Glycol

Examples of the alkylene glycols to constitute a polyester and an unsaturated polyester, that is, alkylene glycols which can be recovered by the first to the fifth embodiments of the invention, include ethylene glycol diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanediol and 1,4-benzenediol. For example, when the polyester is polyethylene terephthalate, ethylene glycol can be recovered as the alkylene glycol, and when the polyester is polybutylene terephthalate, butylene glycol can be recovered as a monomer.

Saturated Dibasic Acid

Examples of the saturated dibasic acids to constitute a polyester and an unsaturated polyester, that is, saturated dibasic acids which can be recovered by the first to the third embodiments of the invention, include aromatic dicarboxylic acids, such as terephthalic acid, phthalic acid (ortho form), isophthalic acid, dibromoisophthalic acid, sodium sulfoisophthalate, phenylenedioxydicarboxylic acid, 4,4'-diphenyldicarboxylic acid, 4,4'-diphenyletherdicarboxylic acid, 4,4'-diphenylketonedicarboxylic acid, 4,4'-diphenoxyethanedicarboxylic acid, 4,4'-diphenylsulfonedicarboxylic acid, 2,6-naphthalenedicarboxylic acid, trimellitic acid and pyromellitic acid. Further, other dicarboxylic acids, for example, alicyclic dicarboxylic acids, such as hexahydroterephthalic acid and hexahydroisophthalic acid, and aliphatic dicarboxylic acids, such as succinic acid, glutaric acid, adipic acid, pimelic acid, suberic acid, azelaic acid, sebacic acid, undecadicarboxylic acid and dodecadicarboxylic acid, can be also mentioned as the saturated dibasic acids.

Unsaturated Polybasic Acid, Polymerizable Vinyl Monomer

Examples of the unsaturated polybasic acids to constitute an unsaturated polyester include meleic acid, maleic anhydride, fumaric acid, itaconic acid and citraconic acid. Examples of the polymerizable vinyl monomers include styrene, vinyltoluene, methyl methacrylate, diallyl phthalate and diallyl terephthalate.

Molded Article, Waste Matter

In industrial utilization of the depolymerization method and the monomer recovering method of the invention, a molded article containing a polyester or an unsaturated polyester, particularly a waste matter, is supposed to be a target. This waste matter means a waste matter given after a molded article containing a polyester or an unsaturated polyester is used, a residue or a defective given when a molded article is produced, or the like. Examples of such waste matters include spent PET bottles, cups, cords and packages, burrs and sprue slugs given when these articles are produced, and sheets given after cup cutting after vacuum forming.

The molded article containing a polyester or an unsaturated polyester may be a molded article composed of only a polyester or an unsaturated polyester, or may be a molded article containing a polyester or an unsaturated polyester and other components (publicly known conventional additives such as colorant).

Unsaturated polyesters are widely used for fiber-reinforced plastics (FRP) that are composites of unsaturated polyesters and glass fibers, and a molded article containing a filler such as the glass fiber can also become a target of the invention. The filler may be, for example, calcium carbonate, silica, glass frit, aluminum hydroxide, glass fiber chopped strand, glass fiber roving, carbon fiber or aramid fiber. Such a filler may be contained in the molded article in an amount of about 50 to 500 parts by weight based on 100 parts by weight of the resin component.

Reaction Solvent

In the depolymerization method of the first embodiment of the invention, depolymerization reaction is carried out in the presence of an alkylene glycol in which a titanium oxide fine powder has been dispersed. In the depolymerization methods of the second to the fifth embodiments of the invention, depolymerization reaction is carried out in the presence of a monohydric alcohol or polyhydric alcohol containing an alkali metal and/or an alkaline earth metal.

The alkylene glycol, the polyhydric alcohol, the monohydric alcohol, the titanium oxide fine powder, the alkali metal, the alkaline earth metal and compounds thereof for use in the polymerization reaction are described in order hereinafter.

In the description of the invention, the alkylene glycol, the polyhydric alcohol and the monohydric alcohol for use in the first to the fifth depolymerization methods are sometimes referred to as "alcohols" generically. The titanium oxide fine powder, the alkali metal, the alkaline earth metal and the like that are used in the first to the fifth embodiments by adding them to the above alcohols are sometimes referred to as "reaction catalyst" generically. The "alkylene glycol in which a titanium oxide fine powder has been dispersed" and the "monohydric alcohol or polyhydric alcohol containing an alkali metal and/or an alkaline earth metal" are sometimes referred to as "reaction solvent" generically.

Alcohols

As the alkylene glycols for use in the first embodiment of the invention, alkylene glycols previously mentioned as monomers of the polyester are employable, and of these, ethylene glycol or propylene glycol is preferable because of inexpensiveness and low viscosity. These alkylene glycols may be used singly or may be used as a mixture of two or more kinds.

On the other hand, as the monohydric alcohols and the polyhydric (dihydric or higher) alcohols for use in the second to the fifth embodiments of the invention, those which are liquid at ordinary temperature, have low viscosity and have high boiling point are preferable. Such monohydric alcohols and polyhydric alcohols as given below may be used singly or may be used as a mixture of two or more kinds.

Examples of the polyhydric alcohols include ethylene glycol, n-propylene glycol, isopropylene glycol, diethylene glycol, triethylene glycol, dipropylene glycol, 1,3-butanediol, 1,4-butanediol, glycerol, polyethylene glycol, polypropylene glycol, pentaerythritol and trimethylolpropane. Of these polyhydric alcohols, ethylene glycol, n-propylene glycol, isopropylene glycol, diethylene glycol, polyethylene glycol, triethylene glycol and glycerol are preferable because they have high boiling point, hardly suffer troubles such as bumping during the depolymerization reaction and have relatively high reactivity. From the viewpoints of excellent hue of the resulting saturated dibasic acid, glycerol is particularly preferable.

On the other hand, examples of the monohydric alcohols include alkyl ether compounds of the above-mentioned polyhydric alcohols such as diol and triol (e.g., diethylene glycol monomethyl ether), benzyl alcohol and 2-ethylhexanol. Of these, alkyl ether compounds of ethylene glycol, propylene glycol, n-propylene glycol, isopropylene glycol, diethylene glycol, polyethylene glycol, triethylene glycol, glycerol and the like, and benzyl alcohol are preferable.

For example, benzyl alcohol has a somewhat low boiling point, and therefore, in order to completely depolymerize an unsaturated polyester, a reaction time of about 2 hours is required. Benzyl alcohol, however, has advantages such that it has a suitable degree of microwave absorption for use in the depolymerization reaction of an unsaturated polyester, the reaction product obtained by the depolymerization reaction can be easily separated and recovered because it has excellent solubility in an organic solvent such as chloroform, and benzyl alcohol is excellent in workability because of low odor. Therefore, benzyl alcohol is a particularly preferred monohydric alcohol in the fifth embodiment of the invention.

Titanium Oxide Fine Powder

As general titanium oxide, there are three types of rutile type titanium oxide of tetragonal crystal system which is used as a white pigment, anatase type titanium oxide of tetragonal crystal system which is excellent in photocatalytic function and brookite type titanium oxide of orthorhombic crystal system. As the titanium oxide in the first embodiment of the invention, any of these titanium oxides is employable. From the viewpoints of reactivity and ease of obtaining, however, anatase type titanium oxide is preferably employed.

Powdery anatase type titanium oxide can be prepared by various methods publicly known. For example, it can be prepared by a vapor phase method, a CVD (chemical vapor deposition) method, or a liquid phase method, such as sol-gel method, HyCOM (hydrothermal crystallization in organic media) method or sulfuric acid method. For example, "Degussa P-25" (available from Nippon Aerosil Co., Ltd) is typical anatase type titanium oxide prepared by the vapor phase method.

The bulk density of the titanium oxide fine powder in the invention is usually not more than 0.5 $g/cm^3$, preferably not more than 0.3 $g/cm^3$, particularly preferably 0.1 $g/cm^3$. The bulk density of the titanium oxide fine powder referred to herein is a value measured by the method of JIS K 5101. The true density of titanium oxide is considered to be 4.2 $g/cm^2$, so that it can be said that the titanium oxide preferably used in the invention has a low bulk density, in other words, a high void ratio.

The bulk density is a property relating also to a particle diameter or a specific surface area of the titanium oxide fine powder. In the present invention, as the bulk density is decreased, that is, as the particle diameter of the titanium oxide fine powder is decreased and the specific surface area thereof is increased, the reaction activity tends to increase. In the present invention, the particle diameter of the titanium oxide fine powder is usually not more than 200 nm, preferably not more than 20 nm, particularly preferably not more than 10 nm, and the specific surface area is usually not less than 10 $m^2/g$, preferably not less than 50 $m^2/g$, particularly preferably not less than 300 $m^2/g$.

Alkali Metal, Alkaline Earth Metal and the Like

In the second to the fifth embodiments of the invention, depolymerization reaction is carried out in the presence of alcohols containing an alkali metal and/or an alkaline earth metal.

In the present invention, the alcohols "containing an alkali metal and/or an alkaline earth metal" are reaction solvents obtained by adding at least one of alkali metal simple substances, alkaline earth metal simple substances, alkali metal compounds and alkaline earth metal compounds to alcohols. At least a part of the alkali metal simple substance or the alkali metal compound added has only to be dissolved to allow an alkali metal ion to be present in the alcohols, and even if insoluble matters such as the alkali metal compound remain, the depolymerization reaction is not hindered.

The alkali metals mean monovalent metals, such as lithium, sodium, potassium, rubidium and cesium. Of these, sodium or potassium that is relatively inexpensive is preferable, and sodium is most preferable because it is inexpensively obtainable. On the other hand, the alkaline earth metals mean metals, such as beryllium, magnesium, calcium, strontium, barium and radium.

From the viewpoints of handling property and cost, the alcohols (reaction solvents) containing an alkali metal and/or an alkaline earth metal for use in the second to the fifth embodiments of the invention are desirably prepared by adding an alkali metal compound and/or an alkaline earth metal compound as a reaction catalyst to alcohols.

Examples of the alkali metal compounds and the alkaline earth metal compounds include oxides of the aforesaid alkali metals and alkaline earth metals; hydroxides thereof; inorganic acid salts thereof, such as carbonates, hydrogencarbonates, nitrates, nitrites, sulfates, sulfites, chlorides, hypochlorites, silicates, phosphates and phosphites thereof; organic acid salts thereof, such as formates, acetates, citrates and oxalates thereof; and alcoholates thereof using alcohols. These compounds may be used singly or may be used in combination of two or more kinds.

Of the above compounds, preferable are hydroxides, carbonates, hydrogencarbonates and phosphates of alkali metals, specifically, sodium hydroxide, sodium carbonate, sodium hydrogencarbonate, potassium hydroxide, potassium carbonate, potassium hydrogencarbonate, tripotassium phosphate (hydrate) and the like, taking into account that the reaction is rapidly carried out, impurities are not included in the monomer recovered after the reaction, and the production cost is low.

For example, when sodium hydroxide is used in combination with ethylene glycol or the like, reaction rate and conversion become excellent. Therefore, sodium hydroxide is one of typical alkali metal compounds in the invention. If a molded article of an unsaturated polyester containing glass fibers (FRP) is depolymerized and if sodium hydroxide and ethylene glycol are used, dissolution of the glass fibers in the alkali is sometimes observed depending upon the reaction conditions. Such a problem, however, can be inhibited by using tripotassium phosphate and benzyl alcohol in combination. Therefore, tripotassium phosphate is one of preferred alkali metal compounds in the fifth embodiment.

Microwave Irradiation

Microwaves

In the method of the invention, microwaves are used for accelerating depolymerization reaction of a polyester.

Microwaves are high-frequency waves having a frequency of about 100 MHz to 1000 GHz. For example, in Japan, microwaves of 2450 MHz are generally admitted for home use, and microwaves of 915 MHz are also used for food thawing. In the present invention, any of these microwaves can be employed.

Microwave Generating Device

As a device for generating such microwaves, not only an electronic oven for home use or industrial use but also publicly known various microwave generating/treating devices of batch type or continuous type having a conveying part such as a belt conveyor are employable.

Even if any of the above microwave generating devices is used, the reactant consisting of a polyester or an unsaturated polyester and a reaction solvent is desirably contained in a container that absorbs no microwave, such as a glass, ceramic or fluororesin container. In the case of a large reactor, it is possible that the reactor is partially provided with a window of quartz glass or heat-resistant glass and a microwave oscillation part is installed at the window to irradiate the interior of the reactor. It is also possible to use a device into which microwaves are guided from the oscillation part through a metallic waveguide.

Depolymerization Method

The method for depolymerizing a polyester or an unsaturated polyester generally comprises a step of preparing a reaction solvent, a step of immersing a polyester or an unsaturated polyester in the reaction solvent and a step of irradiating the polyester or the unsaturated polyester with microwaves to promote depolymerization reaction.

The first to the fifth embodiments of the method for depolymerizing a polyester or an unsaturated polyester of the invention are described hereinafter in order of step.

Optional Steps: Cleaning, Grinding and the Like

In the case where the target of depolymerization is polyester or unsaturated polyester waste having been recovered, the waste is preferably cleaned to remove dirt adhering to the waste, such as the contents and mud, before it is subjected to the depolymerization method of the invention.

In the present invention, the reaction rate of the depolymerization reaction is high, and therefore, the recovered polyester or unsaturated polyester waste or the like in the form of a relatively large fragment can be used as it is in the depolymerization reaction. In order to promote the reaction more efficiently, however, the waste or the like may be subjected to a grinding treatment for mechanically cutting and grinding it into particles. The grinding treatment is carried out by a preferred means publicly known. For example, the polyester waste can be ground into chips of 2 to 8 mm square by a grinding treatment using a hammer mill or the like, followed by depolymerization reaction.

Further, a technique of immersing the chips obtained by grinding to remove components which are lighter than water (e.g., resin other than polyester or unsaturated polyester) or a technique of blowing the grinds with an air flow to recover those of a certain range may be used in combination, when needed.

Even if caps, labels, foreign matters, etc. are not completely removed by the above treatments, they do not exert any influence on the depolymerization reaction of the invention, and therefore, there is no need to carry out separation, cleaning and grinding minutely, differently from the existing feedstock recycling.

Step 1: Preparation of Reaction Solvent

In the depolymerization method of the invention, the titanium oxide fine powder, the alkali metal compound or the like is added to the alcohol and dispersed or dissolved therein to prepare a reaction solvent first. The titanium oxide fine powder, the alkali metal compound or the like is preferably added little by little with stirring the alcohol, and in order to rapidly disperse or dissolve it, an ultrasonic wave generator or a usual heater may be used. In the case where an alkali metal compound or the like that is soluble in the alcohol is used, it dissolves with progress of depolymerization reaction by irradiating it with microwaves after introduction, and hence, a dissolving operation as a pretreatment is generally unnecessary.

In the first embodiment of the invention, the reaction catalyst (titanium oxide fine powder) is added to an alkylene glycol and dispersed therein. The amount of the titanium oxide fine powder added to the alkylene glycol is in the range of usually 0.1 to 20 parts by weight, preferably 0.5 to 10 parts by weight, particularly preferably 1.0 to 7 parts by weight, based on 100 parts by weight of the polyester.

In the second and the third embodiments of the invention, the reaction catalyst (alkali metal compound or the like) is added to the alcohol and dissolved therein. The amount of the reaction catalyst added to the alcohol is in the range of usually 0.01 to 100 mol, preferably 0.1 to 10 mol, particularly preferably 0.8 to 1.2 mol, based on 1 mol of the saturated dibasic acid to constitute the polyester.

Also in the fourth and the fifth embodiments of the invention, the reaction catalyst (alkali metal compound or the like) is added to the alcohol and dissolved therein. The amount of the reaction catalyst added to the alcohol is in the range of usually 0.01 to 100 mol, preferably 0.1 to 10 mol, particularly preferably 0.8 to 1.2 mol, based on 1 mol of the organic acids (total of saturated dibasic acid and unsaturated dibasic acid) to constitute the polyester.

In the second to the fifth embodiments of the invention, the depolymerization reaction sometimes varies between the transesterification type and the alkali hydrolysis type depending upon the type of the reaction catalyst used (alkali metal and/or alkaline earth metal compound released into the reaction solvent) and the amount thereof based on the polyester or the unsaturated polyester. However, by properly controlling the amount of the reaction catalyst added based on the polyester or the like according to the type of the reaction catalyst, depolymerization reaction of the desired type can be carried out.

For example, in the case where the reaction catalyst is sodium hydroxide, the amount of sodium hydroxide added based on the polyester is made relatively small (e.g., about 0.5 to 1 mol based on 1 mol of the saturated dibasic acid to constitute the polyester), whereby depolymerization reaction of transesterification type proceeds (the third and the fifth embodiments of the invention). Contrary to this, by making the amount of the alcohol based on the polyester relatively large (e.g., about 2 to 3 mol or more based on 1 mol of the saturated dibasic acid to constitute the polyester), depolymerization reaction of alkali hydrolysis type proceeds (the second and the fourth embodiments of the invention). On the other hand, in the case where the reaction catalyst is tripotassium phosphate, reaction of transesterification only proceeds provided that the amount of tripotassium phosphate added is in the aforesaid range (the third and the fifth embodiments of the invention).

In the second to the fifth embodiments, the atmosphere is preferably made to be a nitrogen atmosphere so that the alkali metal or the like dissolved in the alcohol should not be exhausted by the reaction with carbon dioxide in air.

Step 2: Immersion of Polyester or Unsaturated Polyester

Next, the polyester or the unsaturated polyester is immersed in the reaction solvent prepared in the step 1. In this step, the weight ratio between the reaction solvent and the polyester or the unsaturated polyester is about 1-50:1, preferably 3-15:1, in any of the first to the third embodiments of the invention.

Step 3: Depolymerization Reaction by Irradiation with Microwaves

After the above preparation is completed, the reaction solvent/polyester mixture or the reaction solvent/unsaturated polyester mixture is irradiated with microwaves. The reaction type may be any of continuous reaction type and batch type. The mixture is desirably subjected to the reaction in such a state that the mixture is contained in a container that absorbs no microwave, such as a ceramic container, as previously described.

The depolymerization reaction time is not specifically restricted and can be properly controlled according to the types and the amounts of the reaction solvent (alcohols, reaction catalyst) used and the target subjected to the depolymerization reaction. However, the depolymerization reaction time is generally as follows.

In the depolymerization method of the first embodiment of the invention, the depolymerization reaction is carried out for usually 5 minutes to 10 hours, preferably 10 minutes to 1 hour, particularly preferably 15 to 45 minutes.

In the depolymerization method of the second embodiment of the invention, the depolymerization reaction is carried out for usually 10 seconds to 20 minutes, preferably 30 seconds to 10 minutes, particularly preferably 1 minute to 5 minutes.

In the depolymerization method (hydrolysis type) of the fourth embodiment of the invention, the depolymerization reaction is carried out for usually 1 minute to 60 minutes, preferably 3 minutes to 30 minutes, particularly preferably 5 minutes to 15 minutes.

In the depolymerization method (transesterification type) of the fifth embodiment of the invention, the depolymerization reaction is carried out for usually 1 to 12 hours, preferably 1 to 6 hours, particularly preferably 1 to 3 hours.

Method for Recovering Monomer

In the case where a polyester is depolymerized in the first embodiment of the invention, an alkylene glycol and a bis-β-hydroxyalkyl ester of a saturated dibasic acid are formed.

In the case where a polyester is depolymerized in the second embodiment of the invention, an alkylene glycol and a dialkali metal salt of a saturated dibasic acid are formed, and in the third embodiment, an alkylene glycol and an ester compound of a saturated dibasic acid having a residue of an alcohol used for a reaction solvent are formed.

In the case where an unsaturated polyester is depolymerized in the fourth embodiment of the invention, an alkylene glycol and a dialkali metal salt of an oligomer (partial decomposition product of unsaturated polyester) are formed, and in the fifth embodiment, an alkylene glycol and an ester compound of the oligomer having a residue of an alcohol used for a reaction solvent are formed.

In the present invention, such reaction products as mentioned above can be recovered after completion of the depolymerization reaction. By further using transesterification reaction or neutralization reaction, the saturated dibasic acid or the oligomer can be purified. The resulting alkylene glycol, saturated dibasic acid and oligomer can be reused as raw materials of a polyester, an unsaturated polyester or a polyurethane.

In the recovery of the reaction products, it is desirable to remove impurities contained in the molded article, the waste matter or the like having been subjected to the depolymerization reaction. The means to remove impurities is not specifically restricted, and appropriate methods and devices are employable. For example, solid matters, such as resins other than the polyester which remain unreacted (polyethylene, polypropylene, polyvinyl chloride, etc.) and depolymerization catalysts, specifically powdery titanium oxide, an undissolved alkali metal compound and the like, can be removed by the use of meshes or the like. Since a pigment, a filler and the like cannot be removed by meshes, it is preferable to remove them by centrifugal separation, filtration using an absorbent such as activated carbon, or the like. The filler contained in the unsaturated polyester waste, such as glass fiber, is separated as above and can be used again for FRP.

The method for recovering an alkylene glycol that is formed by the first to the fifth embodiments of the invention, the method for recovering a saturated dibasic acid or an oligomer from an ester compound of a saturated dibasic acid or an oligomer by further utilizing transesterification reaction, said ester compound being formed by the first, the third or the fifth embodiment of the invention, the method for recovering a saturated dibasic acid from a dialkali metal salt of a saturated dibasic acid by further utilizing neutralization reaction, said dialkali metal salt being formed by the second embodiment, etc. are described in order hereinafter.

Recovery of Alkylene Glycol

In the case where an alcohol different from an alkylene glycol that is a constituent of a polyester or an unsaturated polyester is used as a reaction solvent in the first to the fifth embodiments of the depolymerization reaction of the invention, the alkylene glycol formed by the depolymerization and the reaction solvent are temporarily mixed, but by separating them from each other, it becomes possible to recover only the alkylene glycol formed by the depolymerization.

The method to separate the alkylene glycol formed by the depolymerization reaction and the reaction solvent from each other is not specifically restricted, and an appropriate method has only to be selected according to the target compound. For example, it is preferable to separate them by a distillation/concentration method. As a means for the distillation/concentration, a conventional distillation/concentration device, such as a continuous type vacuum distillation device or a batch type vacuum distillation device, can be employed.

On the other hand, in the case where the alkylene glycol formed by the depolymerization reaction and the reaction solvent are the same as each other, the alkylene glycol formed can be recycled and reused as a reaction solvent in the depolymerization step without separating it.

Recovery of Saturated Dibasic Acid or Oligomer by Transesterification

When a polyester is depolymerized by the first, the third or the fifth embodiment of the invention, an ester compound of a saturated dibasic acid or an oligomer is formed, and this product varies depending upon the type of a glycol used for the depolymerization reaction. For example, when polyethylene terephthalate is depolymerized by the use of ethylene glycol as a solvent in the first embodiment of the invention, bis(β-hydroxyethyl)teraphthalate (BHET) is obtained as a monomer, and when polyethylene terephthalate is depolymerized by the use of propylene glycol as a solvent, bis(β-hydroxyethylisopropyl)terephthalate (BHEPT) is mainly obtained as a monomer.

The ester compound of an oligomer obtained by the fifth embodiment of the invention using, for example, benzyl alcohol and tripotassium phosphate has extremely good solubility in chloroform or the like. Therefore, solvent extraction is easy, and the ester compound can be efficiently recovered. The ester compound of a saturated dibasic acid or an oligomer may be recovered by other means such as filtration or distillation.

By further subjecting the thus obtained ester compound (e.g., BHET) of a saturated acid or an oligomer to transesterification reaction with methanol, a methyl ester of a saturated dibasic acid or an oligomer (e.g., DMT) can be recovered.

The point that such an ester compound of a saturated dibasic acid or an oligomer as mentioned above is obtained as a depolymerization reaction product is common to the method of the invention and the conventional glycolysis method, and hence, a publicly known technique can be properly used for the following transesterification reaction.

The transesterification reaction is schematically described below. For example, the depolymerization reaction concentrated solution and methanol are subjected to transesterification reaction at about 65 to 85° C. over a period of 0.5 to 5 hours in the presence of a transesterification reaction catalyst (alkali metal compound or the like), whereby a slurry in which solid DMT has been dispersed in a mixed liquid of methanol and an alkylene glycol is obtained. Further, the resulting cake containing DMT is separated by the use of a solid-liquid separation device or the like and subjected to distillation purification, whereby purified DMT can be recovered.

Recovery of Saturated Dibasic Acid by Neutralization Reaction

When a polyester is depolymerized by the second or the fourth embodiment of the invention, a dialkali metal salt of a saturated dibasic acid or an oligomer is formed, and this product varies depending upon the type of the alkali metal used for the depolymerization reaction. For example, when polyethylene terephthalate is depolymerized by the use of sodium hydroxide as a catalyst, sodium teraphthalate is formed together with ethylene glycol.

Since the dialkali metal salt of a saturated dibasic acid (e.g., sodium terephthalate) is dissolved little in an alcohol that is a reaction solvent and forms crystals, the crystals can be easily separated from the solvent by filtration or the like. The alcohol adhering to the resulting powdery coarse crystals can be removed by washing the crystals with an alcohol such as methanol or ethanol.

Subsequently, the crystals of the dialkali metal salt of a saturated dibasic acid are dissolved in water and then mixed with an acid to carry out neutralization reaction, whereby a saturated dibasic acid (e.g., terephthalic acid) is formed. This saturated dibasic acid is also precipitated as crystals in water, so that the crystals can be recovered by separating them from water through centrifugal separation or the like.

The weight of water added in this recovery step is preferably about 3 to 10 times the weight of the dialkali metal salt of a saturated dibasic acid. On the other hand, the amount of the acid fed in order to liberate the saturated dibasic acid is preferably equimolar to or higher than the amount of an alkali metal contained in the dialkali metal salt of a saturated dibasic acid, and the most preferred conditions are conditions of strong acidity of pH 2. Examples of the acids employable include inorganic acids, such as hydrochloric acid, sulfuric acid, phosphoric acid and nitric acid, and organic acids, such as formic acid, acetic acid and oxalic acid. Of these, inorganic acids, particularly hydrochloric acid and sulfuric acid, are preferable because the amounts of impurities in the resulting monomer can be decreased. The neutralization reaction temperature is preferably in the range of 65 to 85° C. The neutralization reaction is completed in usually 0.5 to 5 hours.

EXAMPLES

The present invention is further described with reference to the following examples, but it should be construed that the invention is in no way limited to those examples.

As a microwave oscillator for microwave irradiation, the following device was used.

Electronic oven: ER-B2(WT), manufactured by Toshiba Corporation, high frequency output: 500 W Electronic oven: RO-S5B, manufactured by Mitsubishi Electric Corporation, high frequency output: 200 W/500 W μ-Reactor: manufactured by Shikoku Instrumentation Co., Ltd., microwave frequency: 2.45 GHz, microwave output: 0 to 700 W In the depolymerization (transesterification type) of PET, two kinds of titanium oxides shown in the following table were used.

TABLE 1

| $TiO_2$ | Symbol | Bulk density (g/cm$^3$) | Particle diameter | Specific surface area | Trade name |
|---|---|---|---|---|---|
| Anatase type | A | 0.076 | 7 nm | 331 cm$^2$/g | ST-01 (available from Ishihara Sangyo Kaisha, Ltd.) |
| Rutile type | B | 0.772 | — | — | 34025 (available from Nacalai Tesque Co., Ltd.) |

1. Depolymerization (Transesterification Type) of PET and Recovery of Monomer

Example 1-1

In a 100 ml flat bottom flask, 0.965 g (5 mmol) of polyethylene terephthalate (PET), 6.21 g (100 mmol) of ethylene glycol (EG) and 0.0406 g (5 mmol) of titanium oxide were placed. The container was placed in the electronic oven with keeping the container open, and the container was irradiated with microwaves for 30 minutes. After the contents in the container were allowed to cool, unreacted PET and titanium oxide were filtered off by the use of 40 ml of acetone. Next, acetone was distilled off under reduced pressure. Further, unreacted EG was distilled off under reduced pressure by the use of a kugelrohr distillation device, whereby 3.09 g (54° C./3.5 mmHg to 138° C./2.2 mmHg) of EG was obtained. The results are set forth in Table 2. As a residue, bis(β-hydroxyethyl)terephthalate (BHET) was obtained in an amount of 1.23 g as a white solid. The yield was 96%. Unreacted PET was not recovered at all, and hence the conversion was not less than 99%.

Example 1-2

Depolymerization of PET and recovery of a monomer were carried out in the same manner as in Example 1-1, except that the reaction container was changed to a 50 ml beaker from the 100 ml flat bottom flask. The results are set forth in Table 2.

Example 1-3

Depolymerization of PET and recovery of a monomer were carried out in the same manner as in Example 1-1, except that the amount of titanium oxide added was changed to 0.0081 g (1 mmol) from 0.0406 g (5 mmol) and the reaction time was changed to 60 minutes from 30 minutes. The results are set forth in Table 2.

Example 1-4

Depolymerization of PET and recovery of a monomer were carried out in the same manner as in Example 1-3, except that the reaction time was changed to 90 minutes from 60 minutes. The results are set forth in Table 2.

Example 1-5

Depolymerization of PET and recovery of a monomer were carried out in the same manner as in Example 1-1, except that the amount of titanium oxide added was changed to 0.004 g (0.5 mmol) from 0.0406 g (5 mol). The results are set forth in Table 2.

Example 1-6

Depolymerization of PET and recovery of a monomer were carried out in the same manner as in Example 1-5, except that the reaction time was changed to 90 minutes from 30 minutes. The results are set forth in Table 2.

Example 1-7

Into a three neck flask, 1.00 g of PET, 19.0 g of diethylene glycol monomethyl ether (DGMM) and 1.00 g of $K_3PO_4 \cdot nH_2O$ were weighed, and they were irradiated with microwaves for 20 minutes by the use of the μ-Reactor. After the reaction, 50 ml of acetone was added, and the reaction mixture was irradiated with ultrasonic waves to dissolve the product, followed by suction filtration. The filtrate was concentrated and subjected to kugelrohr distillation to obtain BMEET. The results are set forth in Table 2.

Example 1-8

Depolymerization of PET and recovery of a monomer were carried out in almost the same manner as in Example 1-7, except that the solvent was changed to ethylene glycol from DGMM and the reaction time was changed to 80 minutes from 20 minutes. The results are set forth in Table 2.

Comparative Example 1-1

In a 100 ml round bottom recovery flask, 0.97 g of PET, 9.36 g of EG and 0.0400 g of titanium oxide were placed, and with stirring, they were heated under reflux for 2 hours in an oil bath at 180° C. After the contents in the flask were allowed to cool, unreacted PET and titanium oxide were filtered off by the use of 40 ml of acetone. At this time, 0.97 g of unreacted PET was recovered. Then, acetone was distilled off under reduced pressure. Further, unreacted EG was distilled off under reduced pressure by the use of a kugelrohr distillation device, whereby 9.34 g (95° C./15 mmHg to 157° C./18 mmHg) of ES was obtained. As a residue, a white solid was obtained in a slight amount. As a result of IR measurement, however, absorption of BHET was not observed at all. Any reaction did not proceed at all.

Comparative Example 1-2

In a 50 ml beaker, 0.97 g of PET, 9.32 g of EG and 0.0412 g of titanium oxide were placed, and they were heated at 150° C. for 40 minutes with stirring by a magnetic stirrer for heating. After the contents in the beaker were allowed to cool, unreacted PET and titanium oxide were filtered off by the use of 40 ml of acetone. At this time, 0.962 g of unreacted PET was recovered. Then, acetone was distilled off under reduced pressure. Further, unreacted ES was distilled off under reduced pressure by the use of a kugelrohr distillation device, whereby 0.44 g (67° C./2.2 mmHg to 142° C./2.2 mmHg) of EG was obtained. Most of EG was evaporated outside the system. As a residue, a white solid was obtained in a slight amount. As a result of IR measurement, however, absorption of BHET was not observed at all. Any reaction did not proceed at all.

Reference Example 1-1

Depolymerization of PET and recovery of a monomer were carried out in the same manner as in Example 2, except that titanium oxide was changed to titanium B from titanium A. The results are set forth in Table 2.

TABLE 2

| Example | PET (g) (mmol) | Catalyst[1] (g) (mmol) | Solvent[2] (g) (mmol) | Reaction method[3], Reaction time (min) | Recovered product[4] (g) (mmol) | Yield (%) | Unreacted PET (g) (mmol) | Conversion (%) |
|---|---|---|---|---|---|---|---|---|
| Ex. 1-1 | 0.965 (5) | A 0.041 (0.25) | EG 6.21 (100) | microwave 30 | BHET 1.23 (4.8) | 96 | not recovered | 99 |
| Ex. 1-2 | 0.961 (5) | A 0.041 (0.25) | EG 9.31 (150) | microwave 30 | BHET 1.13 (4.5) | 89 | 0.025 (0.13) | 97 |
| Ex. 1-3 | 0.972 (5) | A 0.0081 (0.05) | EG 6.22 (100) | microwave 60 | BHET 1.22 (4.8) | 95 | — | — |
| Ex. 1-4 | 0.966 (5) | A 0.0085 (0.05) | EG 6.23 (100) | microwave 90 | BHET 1.24 (4.9) | 97 | — | — |
| Ex. 1-5 | 0.963 (5) | A 0.0040 (0.025) | EG 6.23 (100) | microwave 30 | BHET 0.43 (1.7) | 34 | 0.33 (1.7) | 35 |
| Ex. 1-6 | 0.970 (5) | A 0.0043 (0.025) | EG 6.22 (100) | microwave 90 | BHET 1.18 (4.7) | 92 | 0.0026 (0.014) | 99.7 |
| Ex. 1-7 | 1.00 (5.2) | $K_3PO_4 \cdot nH_2O$ 0.0043 | DGMM 19.0 (160) | microwave 20 | BMEET 1.79 (4.8) | 93 | — | — |
| Ex. 1-8 | 1.00 (5.2) | $K_3PO_4 \cdot nH_2O$ 0.0043 | EG 10.0 (160) | microwave 80 | BHET 0.78 (3.1) | 59 | — | — |
| Comp. Ex. 1-1 | 0.97 (5) | A 0.0040 (0.025) | EG 9.36 (150) | heating under reflux 120 | unreacted | unreacted | 0.97 (5.1) | unreacted |
| Comp. Ex. 1-2 | 0.969 (5) | A 0.041 (0.25) | EG 9.32 (150) | heating 40 | unreacted | unreacted | 0.96 (5.0) | unreacted |
| Ref. Ex. 1-1 | 0.962 (5) | B 0.042 (0.25) | EG 9.32 (150) | microwave 30 | BHET 1.23 (4.8) | 6 | 0.93 (4.9) | 3 |

Note
(Table 2)
[1] A and B indicate "anatase type" titanium oxide and "rutile type" titanium oxide in the foregoing Table 1, respectively.
[2] Solvent EG: ethylene glycol, DGMM: diethylene glycol monomethyl ether
[3] In Examples 1-7 and 1-8, microwave irradiation was carried out using the μ-Reactor, and in other examples, microwave irradiation was carried out using the electronic oven.
[4] Recovered product BHET: bis(β-hydroxyethyl)terephthalate, BMEET: bis(methoxyethoxyethyl)terephthalate 2. Depolymerization (Hydrolysis Type) of PET and Recovery of Monomer Example 2-1

In a 200 ml flat bottom round flask, 6.37 g of ethylene glycol (EG) as a reaction solvent and 0.500 g of sodium hydroxide (NaOH) as a catalyst were placed, and they are irradiated with ultrasonic waves for 1 hour to prepare a homogeneous solution. Next, 0.961 g of a polyethylene terephthalate (PET) chip (about 3 mm×3 mm) was immersed in the solution. Then, the flask was set in the electronic oven and irradiated with microwaves for 2.0 minutes.

After cooling, soluble matters were extracted by the use of 50 ml of acetone, 50 ml of chloroforms and 100 ml of water, respectively. Any residue was not recovered at all. Acetone-soluble matters and chloroform-soluble matters were rarely present. When hydrochloric acid was added to the aqueous solution to adjust the solution to pH 2, the solution became opaque and terephthalic acid came to be liberated. After filtration and drying, the dried substance was weighed, and as a result, the weight was 0.828 g (5 mmol, yield: 100%). As a result of IR measurement, the dried substance proved to be terephthalic acid. In the above depolymerization reaction, glycolysis reaction did not take place at all (BHET or the like was not formed), and only hydrolysis with sodium hydroxide proceeded.

Example 2-2

Depolymerization of PET and recovery of a monomer were carried out in almost the same manner as in Example 2-1, except that the reaction time was changed to 1.0 minute. The results are set forth in Table 3.

Example 2-3

Depolymerization of PET and recovery of a monomer were carried out in almost the same manner as in Example 2-1, except that the reaction time was changed to 1.5 minutes. The results are set forth in Table 3.

Example 2-4

Depolymerization of PET and recovery of a monomer were carried out in almost the same manner as in Example 2-3, except that the reaction solvent was changed to 10.6 g of diethylene glycol from 6.37 g of ethylene glycol. The results are set forth in Table 3.

Example 2-5

Depolymerization of PET and recovery of a monomer were carried out in almost the same manner as in Example 2-3, except that the reaction solvent was changed to 10.5 g of triethylene glycol from 6.37 g of ethylene glycol. The results are set forth in Table 3.

Example 2-6

Depolymerization of PET and recovery of a monomer were carried out in almost the same manner as in Example 2-3, except that the reaction solvent was changed to 9.99 g of polyethylene glycol (n=300) from 6.37 g of ethylene glycol. The results are set forth in Table 3.

Example 2-7

Depolymerization of PET and recovery of a monomer were carried out in almost the same manner as in Example 2-6, except that the reaction time was changed to 4.0 minutes from 1.5 minutes. The results are set forth in Table 3.

Example 2-8

Depolymerization of PET and recovery of a monomer were carried out in almost the same manner as in Example 2-3, except that the reaction solvent was changed to 9.22 g of glycerol from 6.37 g of ethylene glycol. The results are set forth in Table 3.

Example 2-9

Depolymerization of PET and recovery of a monomer were carried out in almost the same manner as in Example 2-8, except that the reaction time was changed to 2.0 minutes from 1.5 minutes. The results are set forth in Table 3.

Example 2-10

Depolymerization of PET and recovery of a monomer were carried out in almost the same manner as in Example 2-9, except that the reaction catalyst was changed to 0.650 g (11.6 mmol) of KOH. The results are set forth in Table 3.

Example 2-11

Depolymerization of PET and recovery of a monomer were carried out in almost the same manner as in Example 2-9, except that the reaction catalyst was changed to 0.913 g (10.8 mmol) of $NaHCO_3$. The results are set forth in Table 3.

Example 2-12

Depolymerization of PET and recovery of a monomer were carried out in almost the same manner as in Example 2-9, except that the reaction catalyst was changed to 0.603 g (5.65 mmol) of $Na_2CO_3$. The results are set forth in Table 3.

Comparative Example 2-1

In a 200 ml round bottom recovery flask, 0.962 g of PET, 9.23 g of glycerol and 0.572 g of sodium hydroxide were placed, and with stirring, they were heated under reflux for 2 minutes in an oil bath at 180° C. After the contents in the flask were allowed to cool, unreacted PET was filtered off by the use of 100 ml of water. At this time, 0.962 g of unreacted PET was recovered. Then, water was distilled off under reduced pressure to recover 9.80 g of glycerol containing unreacted sodium hydroxide.

From comparison between Comparative Example 2-1 in which heating under reflux was carried out and Example 2-9 in which the reaction catalyst, the reaction solvent and the reaction time were the same as those of Comparative Example 2-1 but microwave irradiation was carried out, it is considered that the microwave irradiation in the invention is not a means for mere heating but accelerates depolymerization reaction by a different function.

Comparative Example 2-2

In a 200 ml flat bottom round flask, 9.23 g of glycerol was placed as a reaction solvent, and 0.963 g of a polyethylene terephthalate (PET) chip (about 3 mm×3 mm) was immersed in the solvent. Then, the flask was set in the electronic oven and irradiated with microwaves for 5.0 minutes. After cooling, 100 ml of water was added, and unreacted PET was filtered off. At this time, 0.963 g of unreacted PET was recovered. Although hydrochloric acid was added to the aqueous solution to adjust the solution to pH 2, anything could not be recovered.

TABLE 3

| Example | PET | Catalyst | Solvent * | Reaction method, Reaction time (min) | Yield of terephthalic acid (%) |
|---|---|---|---|---|---|
| Ex. 2-1 | 0.961 g (5.0 mmol) | NaOH 0.500 g (12.5 mmol) | EG 6.37 g (103 mmol) | microwave irradiation 2.0 | 100 |
| Ex. 2-2 | 0.962 g (5.0 mmol) | NaOH 0.500 g (12.5 mmol) | EG 6.24 g (101 mmol) | microwave irradiation 1.0 | 95 |
| Ex. 2-3 | 0.961 g (5.0 mmol) | NaOH 0.500 g (12.5 mmol) | EG 6.24 g (103 mmol) | microwave irradiation 1.5 | 100 |
| Ex. 2-4 | 0.961 g (5.0 mmol) | NaOH 0.579 g (14.5 mmol) | DEG 10.6 g (100 mmol) | microwave irradiation 1.5 | 100 |
| Ex. 2-5 | 0.961 g (5.0 mmol) | NaOH 0.563 g (14.1 mmol) | TEG 10.5 g (70.1 mmol) | microwave irradiation 1.5 | 93 |
| Ex. 2-6 | 0.962 g (5.0 mmol) | NaOH 0.559 g (14.0 mmol) | PEG 9.99 g | microwave irradiation 1.5 | 62 |
| Ex. 2-7 | 0.962 g (5.0 mmol) | NaOH 0.553 g (13.8 mmol) | PEG 10.0 g | microwave irradiation 4.0 | 100 |
| Ex. 2-8 | 0.962 g (5.0 mmol) | NaOH 0.590 g (14.8 mmol) | glycerol 9.22 g (100 mmol) | microwave irradiation 1.5 | 92 |
| Ex. 2-9 | 0.962 g (5.0 mmol) | NaOH 0.575 g (14.4 mmol) | glycerol 9.28 g (101 mmol) | microwave irradiation 2.0 | 99 |
| Ex. 2-10 | 0.962 g (5.0 mmol) | KOH 0.650 g (11.6 mmol) | glycerol 9.32 g (101 mmol) | microwave irradiation 2.0 | 100 |
| Ex. 2-11 | 0.962 g (5.0 mmol) | NaHCO$_3$ 0.575 g (10.8 mmol) | glycerol 9.27 g (101 mmol) | microwave irradiation 2.0 | 100 |
| Ex. 2-12 | 0.960 g (5.0 mmol) | Na$_2$CO$_3$ 0.575 g (5.65 mmol) | glycerol 9.25 g (101 mmol) | microwave irradiation 2.0 | 99 |
| Comp. Ex. 2-1 | 0.962 g (5.0 mmol) | NaOH 0.572 g (14.1 mmol) | glycerol 9.23 g (100 mmol) | heating under reflux 2.0 | 0 |
| Comp. Ex. 2-2 | 0.963 g (5.0 mmol) | none | Glycerin 9.23 g (100 mmol) | microwave irradiation 5.0 | 0 |

Note
(Table 3)
* Solvent EG: ethylene glycol, DEG: diethylene glycol, TEG: triethylene glycol, PEG: polyethylene glycol 3. Depolymerization (Hydrolysis Type) of FRP and Recovery of Reaction Product Example 3-1

In a 200 ml flat bottom round flask, 6.63 g of ethylene glycol (EG) and 0.561 g of sodium hydroxide (NaOH) were placed, and they are irradiated with ultrasonic waves for 1 hour to prepare a homogeneous solution. Then, 0.505 g of a FRP chip (about 5 mm×5 mm×5 mm) was immersed in the solution, and the flask was set in the electronic oven and irradiated with microwaves for 2 minutes.

After cooling, decomposed oily matters were dissolved in 50 ml of acetone and 50 ml of chloroform. The residual glass fibers were washed with 100 ml of water and then dried to recover 0.338 g of glass fibers. To the acetone-chloroform solution containing the decomposed oily matters and ethylene glycol was added hydrochloric acid to adjust the solution to pH 2, followed by liquid separation extraction. The aqueous phase was further extracted with 50 ml of chloroform to obtain an organic phase, and acetone and chloroform were distilled off under reduced pressure to obtain 6.828 g of brown oily matters. It was proved by gas chromatography that a decomposition product had been recovered together with ethylene glycol, and hence ethylene glycol was distilled off under reduced pressure. Thus, 6.558 g of ethylene glycol and 0.251 g of brown oily matters were obtained. As a result of IR measurement of the brown oily matters, carbonyl carbon derived from an organic acid was confirmed, and therefore, the resulting brown oily matters proved to be derived from a crosslinked polyester of FRP.

Example 3-2

Depolymerization reaction of FRP was carried out in the same manner as in Example 3-1, except that instead of ethylene glycol, propylene glycol was used as the reaction solvent. The results are set forth in Table 4.

Example 3-3

Depolymerization reaction of FRP was carried out in the same manner as in Example 3-1, except that instead of ethylene glycol, diethylene glycol was used as the reaction solvent in an amount of 1.6 times the amount of ethylene glycol, and the reaction time was changed to 3.5 minutes. The results are set forth in Table 4.

Example 3-4

Depolymerization reaction of FRP was carried out in the same manner as in Example 3-1, except that instead of ethylene glycol, polyethylene glycol was used as the reaction solvent in an amount of 1.5 times the amount of ethylene glycol, and the reaction time was changed to 10 minutes. The results are set forth in Table 4.

Example 3-5

Depolymerization reaction of FRP was carried out in the same manner as in Example 3-1, except that instead of NaOH, KOH was used as the depolymerization catalyst, and the reaction time was changed to 5 minutes. The results are set forth in Table 4.

Example 3-6

Depolymerization reaction of FRP was carried out in the same manner as in Example 3-1, except that instead of ethylene glycol, glycerol was used as the reaction solvent in an amount of 1.4 times the amount of ethylene glycol. The results are set forth in Table 4.

Example 3-7

Depolymerization reaction of FRP was carried out in the same manner as in Example 3-6, except that instead of NaOH, KOH was used as the depolymerization catalyst. The results are set forth in Table 4.

Example 3-8

Depolymerization reaction of FRP was carried out in the same manner as in Example 3-6, except that instead of NaOH, LiOH was used as the depolymerization catalyst. The results are set forth in Table 4.

Example 3-9

Depolymerization reaction of FRP was carried out in the same manner as in Example 3-6, except that instead of NaOH, $K_3PO_4$ was used as the depolymerization catalyst, and the reaction time was changed to 11 minutes. The results are set forth in Table 4.

Example 3-10

In a 100 ml flat bottom round flask, 0.53 g of FRP, 10 g of benzyl alcohol and 1.1 g of tripotassium phosphate were placed, and they are irradiated with microwaves for 2.0 minutes by the use of the electronic oven.

After cooling, 50 ml of chloroform was added, and soluble matters and insoluble matters were separated from each other by filtration operation. The insoluble matters were glass fibers, and any melting and decomposition due to reaction were not observed at all. From the content weight, it was found that almost 100% of the glass fibers were recovered. On the other hand, from the chloroform-soluble matters, solvents were concentrated and distilled off under reduced pressure to recover 0.41 g of solid organic matters. In the solid organic matters, a filler was contained. The filler changed to fine particles and could not be separated by the above filtration operation. From IR and NMR measurements of the recovered solid organic matters, it was confirmed that a benzyl ester structure was present in the solid organic matters.

Comparative Example 3-1

In a 100 ml round bottom recovery flask, 0.513 g of FRP, 9.23 g of glycerol and 0.580 g of sodium hydroxide were placed, and with stirring, they were subjected to reaction at 200° C. for 20 minutes by the use of a hot magnetic stirrer. After the reaction mixture was allowed to cool, it was treated in accordance with the operations of Example 3-1. The conversion was 70%.

TABLE 4

| Example | PET | Catalyst | Solvent * | Reaction method, Reaction time (min) | Yield (%) |
|---|---|---|---|---|---|
| Ex. 3-1 | 0.505 g | NaOH 0.561 g (14.0 mmol) | EG 6.63 g | microwave irradiation 2.0 | 100 |
| Ex. 3-2 | 0.504 g | NaOH 0.562 g (14.0 mmol) | PG 7.63 g | microwave irradiation 2.0 | 100 |
| Ex. 3-3 | 0.503 g | NaOH 0.519 g (13.0 mmol) | DEG 10.8 g | microwave irradiation 3.5 | 93 |
| Ex. 3-4 | 0.501 g | NaOH 0.525 g (13.0 mmol) | PEG 10.0 g | microwave irradiation 10.0 | 100 |
| Ex. 3-5 | 0.504 g | KOH 0.537 g (9.5 mmol) | EG 6.26 g | microwave irradiation 5.0 | 93 |
| Ex. 3-6 | 0.506 g | NaOH 0.513 g (12.8 mmol) | glycerol 9.26 g | microwave irradiation 2.0 | 86 |
| Ex. 3-7 | 0.524 g | KOH 0.643 g (11.4 mmol) | glycerol 9.28 g | microwave irradiation 2.0 | 100 |
| Ex. 3-8 | 0.504 g | LiOH 0.529 g (12.5 mmol) | glycerol 9.36 g | microwave irradiation 2.0 | 100 |

TABLE 4-continued

| Example | PET | Catalyst | Solvent * | Reaction method, Reaction time (min) | Yield (%) |
|---|---|---|---|---|---|
| Ex. 3-9 | 0.503 g | $K_3PO_4$ 2.12 g (10.0 mmol) | glycerol 9.22 g | microwave irradiation 11 | 73 |
| Ex. 3-10 | 0.530 g | $K_3PO_4 \cdot nH_2O$ 1.10 g | BA 10.0 g | microwave irradiation 120 | 100 |
| Comp. Ex. 3-1 | 0.513 g | NaOH 0.580 g (14.0 mmol) | glycerol 9.23 g | heating and stirring 20 | 70 |

Note
(Table 4)
* Reaction solvent EG: ethylene glycol, DEG: diethylene glycol, PEG: polyethylene glycol, BA: benzyl alcohol

The invention claimed is:

1. A method for depolymerizing a polyester, comprising irradiating a polyester or a molded article containing a polyester with microwaves in the presence of an alkylene glycol in which a titanium oxide fine powder having a bulk density of not more than 0.3 g/cm³ has been dispersed.

2. The method for depolymerizing a polyester as claimed in claim 1, wherein the titanium oxide is anatase type titanium oxide.

3. The method for depolymerizing a polyester as claimed in claim 1, wherein the alkylene glycol is ethylene glycol and/or propylene glycol.

4. The method for depolymerizing a polyester as claimed in claim 1, wherein the polyester or the molded article containing a polyester is polyethylene terephthalate or a molded article containing polyethylene terephthalate.

5. A method for recovering raw materials of a polyester, an unsaturated polyester or a polyurethane, comprising:
a step of immersing a polyester or a molded article containing a polyester in an alkylene glycol in which a titanium oxide fine powder having a bulk density of not more than 0.3 g/cm³ has been dispersed, and
a step of forming an alkylene glycol and a bis-β-hydroxyalkyl ester of a saturated dibasic acid by the use of the method for depolymerizing a polyester of claim 1.

6. The method for recovering raw materials of a polyester, an unsaturated polyester or a polyurethane as claimed in claim 5, further comprising a step of forming a dimethyl ester of a saturated dibasic acid by transesterification reaction of the bis-β-hydroxyalkyl ester of a saturated basic acid with methanol.

7. The method for recovering raw materials of a polyester, an unsaturated polyester or a polyurethane as claimed in claim 5, wherein the alkylene glycol formed by the depolymerization reaction is reused as a dispersion medium for the depolymerization reaction.

8. A method for depolymerizing a polyester, comprising irradiating a polyester or a molded article containing a polyester with microwaves in the presence of a monohydric alcohol or polyhydric alcohol containing an alkali metal and/or an alkaline earth metal.

9. The method for depolymerizing a polyester as claimed in claim 8, wherein the polyester or the molded article containing a polyester is polyethylene terephthalate or a molded article containing polyethylene terephthalate.

10. The method for depolymerizing a polyester as claimed in claim 8, wherein the alkali metal is one or more alkali metals selected from the group consisting of sodium, potassium and lithium.

11. The method for depolymerizing a polyester as claimed in claim 8, wherein the monohydric alcohol or polyhydric alcohol containing an alkali metal is one obtained by adding one or more alkali metal compounds selected from the group consisting of hydroxides, carbonates, hydrogencarbonates and phosphates of alkali metals to a monohydric alcohol or a polyhydric alcohol.

12. The method for depolymerizing a polyester as claimed in claim 8, wherein the monohydric alcohol or the polyhydric alcohol comprises at least one alcohol selected from the group consisting of ethylene glycol, n-propylene glycol, iso-propylene glycol, diethylene glycol, polyethylene glycol, triethylene glycol and glycerol, alkyl ether compounds of these alcohols, and benzyl alcohol.

13. A method for recovering raw materials of a polyester, an unsaturated polyester or a polyurethane, comprising:
a step of immersing a polyester or a molded article containing a polyester in a monohydric alcohol or polyhydric alcohol containing an alkali metal and/or an alkaline earth metal, and
a step of depolymerizing the polyester by the depolymerization method of claim 8 to form an alkylene glycol and a dialkali metal salt of a saturated dibasic acid or an ester compound of a saturated dibasic acid.

14. The method for recovering raw materials of a polyester, an unsaturated polyester or a polyurethane as claimed in claim 13, further comprising a step of neutralizing the dialkali metal salt of a saturated dibasic acid formed by the depolymerization reaction with an acid to form a saturated dibasic acid.

15. The method for recovering raw materials of a polyester, an unsaturated polyester or a polyurethane as claimed in claim 13, wherein the alkylene glycol formed by the depolymerization reaction is reused by adding it to the solvent for the depolymerization reaction.

16. A method for depolymerizing an unsaturated polyester, comprising irradiating an unsaturated polyester or a molded article containing an unsaturated polyester with microwaves in the presence of a monohydric alcohol or polyhydric alcohol containing an alkali metal and/or an alkaline earth metal.

17. The method for depolymerizing an unsaturated polyester as claimed in claim 16, wherein the alkali metal is one or more alkali metals selected from the group consisting of sodium, potassium and lithium.

18. The method for depolymerizing an unsaturated polyester as claimed in claim 16, wherein the monohydric alcohol or polyhydric alcohol containing an alkali metal is one obtained by adding one or more alkali metal compounds selected from the group consisting of hydroxides, carbonates, hydrogencarbonates and phosphates of alkali metals to a monohydric alcohol or a polyhydric alcohol.

19. The method for depolymerizing an unsaturated polyester as claimed in claim 16, wherein the monohydric alcohol or the polyhydric alcohol comprises at least one alcohol selected from the group consisting of ethylene glycol, n-propylene glycol, isopropylene glycol, diethylene glycol, polyethylene glycol, triethylene glycol and glycerol, alkyl ether compounds of these alcohols, and benzyl alcohol.

20. The method for depolymerizing an unsaturated polyester as claimed in claim 16, wherein the molded article containing an unsaturated polyester is a molded article containing a fiber-reinforced unsaturated polyester.

21. The method for depolymerizing an unsaturated polyester as claimed in claim 20, wherein the fiber is a glass fiber.

22. A method for recovering raw materials of a polyester, an unsaturated polyester or a polyurethane, comprising:
   a step of immersing an unsaturated polyester or a molded article containing an unsaturated polyester in a monohydric alcohol or polyhydric alcohol containing an alkali metal and/or an alkaline earth metal, and
   a step of depolymerizing an unsaturated polyester by the depolymerization method of claim 16 to form an alkylene glycol and an ester compound of an oligomer that is a partial decomposition product of an unsaturated polyester.

23. The method for recovering raw materials of a polyester, an unsaturated polyester or a polyurethane as claimed in claim 22, wherein the alkylene glycol formed by the depolymerization reaction is reused by adding it to the solvent for the depolymerization reaction.

\* \* \* \* \*